(12) United States Patent
Kinoshita et al.

(10) Patent No.: US 8,047,093 B2
(45) Date of Patent: Nov. 1, 2011

(54) PARALLEL ROBOT

(75) Inventors: Satoshi Kinoshita, Yamanashi (JP);
Hikaru Yamashiro, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 20 days.

(21) Appl. No.: 12/685,925

(22) Filed: Jan. 12, 2010

(65) Prior Publication Data
US 2010/0186534 A1    Jul. 29, 2010

(30) Foreign Application Priority Data

Jan. 29, 2009 (JP) ................. 2009-018519

(51) Int. Cl.
*B25J 17/02* (2006.01)
*B25J 18/04* (2006.01)

(52) U.S. Cl. ............. 74/490.03; 74/490.06; 901/15; 901/23; 901/29

(58) Field of Classification Search .. 74/490.01–490.06; 414/735; 901/15, 29
See application file for complete search history.

(56) References Cited

U.S. PATENT DOCUMENTS

| | | | | |
|---|---|---|---|---|
| 4,790,718 A | * | 12/1988 | Vickers | 414/735 |
| 5,243,873 A | * | 9/1993 | Demers | 74/490.06 |
| 6,543,987 B2 | * | 4/2003 | Ehrat | 414/735 |
| 6,841,964 B2 | | 1/2005 | Osuka et al. | |
| 6,896,473 B2 | * | 5/2005 | Schuler | 414/729 |
| 2010/0206120 A1 | * | 8/2010 | Kinoshita et al. | 74/490.06 |

FOREIGN PATENT DOCUMENTS

| | | |
|---|---|---|
| DE | 10314547 A1 | 11/2003 |
| DE | 102008023069 A1 | 11/2009 |
| EP | 0200369 A1 | 11/1986 |
| EP | 1640120 A1 | 3/2006 |
| JP | 445310 B | 7/1992 |
| JP | 2000-046140 | 2/2000 |
| JP | 2002532269 A | 10/2002 |
| JP | 4109062 B | 4/2008 |
| JP | 2008-286363 | 11/2008 |

OTHER PUBLICATIONS

Notice of Reasons for Rejection for Application No. JP2009-018519 issued Jun. 15, 2010.
Office Action for DE 10 2010 006 155.7-15 mailed Mar. 21, 2011.

\* cited by examiner

*Primary Examiner* — Richard W Ridley
*Assistant Examiner* — Terence Boes
(74) *Attorney, Agent, or Firm* — Lowe Hauptman Ham & Berner LLP

(57) ABSTRACT

A parallel robot including a movable-section drive mechanism having a parallel mechanism configuration and operating to allow a movable section to perform a three-axis translational motion with respect to a base section; and a wrist-section drive mechanism operating to allow a wrist section to perform a rotational motion with respect to the movable section. The wrist-section drive mechanism includes a hollow outer holder connected to the base section rotatably about a first rotation axis; a hollow intermediate holder provided in the outer holder rotatably about a second rotation axis orthogonal to the first axis; a hollow inner holder provided inside the intermediate holder rotatably about a third rotation axis orthogonal to the second axis; a prime mover driving the outer holder to rotate about the first axis; and a transmission member received in the inner holder and linearly movable in a rotationally restrained state along a linear-motion axis orthogonal to the third axis, and connected at one end spaced from the inner holder to the wrist section through a universal joint. The transmission member operates to transmit a rotation of the outer holder about the first axis to the wrist section, and to allow the wrist section to perform a rotational motion about a fourth rotation axis orthogonal to the third axis.

5 Claims, 6 Drawing Sheets

PARALLEL ROBOT

RELATED APPLICATIONS

The present application is based on, and claims priority from, Japanese Application Number 2009-018519, filed Jan. 29, 2009, the disclosure of which is hereby incorporated by reference herein in its entirety.

BACKGROUND OF THE INVENTION

1. Field of the Invention

The present invention relates to a parallel robot.

2. Description of the Related Art

A parallel robot is provided, as a manipulator, with a so-called parallel mechanism in which a base section (or a stationary part) and a movable section (or an output part) are interconnected by a plurality of link structures arranged in parallel. In comparison with a serial robot such as an articulated robot, a parallel robot can easily ensure capabilities, such as high speed, high output, high accuracy, high stiffness, etc. In particular, in a parallel robot in which the movable section performs only a three-axis translational motion with respect to the base section, it is known that an auxiliary drive mechanism for controlling an orientation of a tool, such as a hand (also referred to as an end effector) mounted on the movable section, is provided in addition to a movable-section drive mechanism including the parallel link structures.

Japanese Examined Patent Publication (Kokoku) No. 4-45310 (JP4-45310B) describes a parallel robot provided, in addition to a movable-member drive mechanism (i.e., parallel link structures and link drive motors) having a parallel mechanism configuration and arranged between a base member and a movable member, with an auxiliary drive mechanism for rotating an operational member mounted on the movable member, which includes a motor disposed on the base member and a telescopic arm for transmitting the torque of the motor to the operational member. Japanese Unexamined Patent Publication (Kohyo) No. 2002-532269 (JP2002-532269A) also describes a parallel robot similar to that of JP4-45310B. An auxiliary drive mechanism in the parallel robot of JP2002-532269A is configured by an extensible shaft having a telescopic structure configured by assembling an outer tube and an inner shaft together. A "tubular hard bushing" is provided inside the outer tube, as a bearing member for linearly guiding the inner shaft inside the outer tube.

Japanese Patent No. 4109062 (JP4109062B) describes a parallel robot provided, in addition to a carrying-element drive mechanism (i.e., parallel link structures and link drive motors) having a parallel mechanism configuration and arranged between a base element and a carrying element, with an auxiliary drive mechanism for rotating a holding element mounted on the carrying element, which includes a motor disposed on the base element and a variable-length shaft for transmitting the torque of the motor to the holding element. In contrast to the telescopic configurations described in JP4-45310B and JP2002-532269A, the variable-length shaft includes a pair of bars adjacent to and parallely offset from each other, in which the bars are configured to move linearly with respect to each other while maintaining a mutually parallel state under the guiding function of "slide bearing elements" provided respectively on the bars. JP4109062B clearly describes a configuration wherein the bars of the variable-length shaft are coupled respectively to the motor on the base element and the holding element, through respective Cardan joints.

As described above, an auxiliary drive mechanism for controlling the orientation of a tool mounted on a movable section of a parallel robot conventionally uses an essentially extensible rod-shaped member having a telescopic configuration (JP4-45310B and JP2002-532269A) or a linearly-shiftable parallel configuration (JP4109062B), as a transmission member for transmitting the torque of a motor to the tool. Thus, the transmission member can elongate and contract while smoothly following the three-axis translational motion of the movable section obtained by the parallel mechanism, and thereby can transmit the torque of the motor to the tool on the movable section when the movable section is located at a desired (or commanded) spatial position within the operational space of the movable section.

In the above-described conventional parallel robot, the transmission member configured from the extensible rod-shaped member provided in the auxiliary drive mechanism for controlling a tool orientation is connected respectively to the motor on the base section and the tool on the movable section directly or indirectly through respective universal joints. Therefore, when the transmission member operates to elongate or contract, a linear bearing component arranged between a pair of rod-shaped elements in the telescopic configuration or the linearly-shiftable parallel configuration (the "tubular hard bushing" of JP2002-532269A or the "slide bearing elements" of JP4109062B) may interfere with a universal joint component provided at the distal end of each rod-shaped element, so as to restrict the elongation/contraction stroke of the transmission member, and thereby, an operational space inherently provided for the movable section may be constrained. Further, the transmission member configured by assembling a pair of rod-shaped elements tends to generate relatively-large inertial force, and thus there is concern that the inertial force of the transmission member may affect the motion of the movable section. If the diameter of each rod-shaped element is reduced to inhibit the inertial force, there is concern that the stiffness or operational accuracy of the transmission member may be degraded.

SUMMARY OF THE INVENTION

The present invention provides, as one aspect, a parallel robot including an auxiliary drive mechanism for controlling the orientation of a tool mounted on a movable section, which can solve a problem such that an operational space inherently provided for the movable section and determined by a parallel mechanism is restricted by the configuration of the auxiliary drive mechanism, and can improve the stiffness and operational accuracy of the auxiliary drive mechanism.

One aspect of the present invention provides a parallel robot including a base section; a movable section capable of moving with respect to the base section; a movable-section drive mechanism having a parallel mechanism configuration and provided between the base section and the movable section, the movable-section drive mechanism operating to allow the movable section to perform a three-axis translational motion with respect to the base section; a wrist section provided rotatably in the movable section; and a wrist-section drive mechanism operating to allow the wrist section to perform a rotational motion with respect to the movable section. The wrist-section drive mechanism includes a hollow outer holder connected to the base section and rotatable about a first rotation axis; a hollow intermediate holder provided inside the outer holder and rotatable about a second rotation axis orthogonal to the first rotation axis; a hollow inner holder provided inside the intermediate holder and rotatable about a third rotation axis orthogonal to the second rotation axis; a prime mover driving the outer holder to rotate about the first rotation axis; and a rod-shaped transmission member received in the inner holder and linearly movable in a rotationally restrained state along a linear-motion axis orthogonal to the third rotation axis, the rod-shaped transmission member being connected, at one end thereof spaced from the inner holder, to the wrist section through a universal joint. The transmission member operates to transmit a rotation of the outer holder about the first rotation axis to the wrist section, and to allow the wrist section to perform a rotational motion about a fourth rotation axis orthogonal to the third rotation axis.

BRIEF DESCRIPTION OF THE DRAWINGS

The objects, features and advantages of the present invention will become more apparent from the following description of the preferred embodiments in connection with the accompanying drawings, wherein:

FIGS. 4A and 4B are enlarged sectional views showing a main portion of a wrist-section drive mechanism of the parallel robot of FIG. 1, wherein FIG. 4A is a vertical sectional view showing a holder assembly and FIG. 4B is another vertical sectional view showing the holder assembly;

DETAILED DESCRIPTION

The embodiments of the present invention are described below, in detail, with reference to the accompanying drawings. In the drawings, same or similar components are denoted by common reference numerals.

Figure 1:
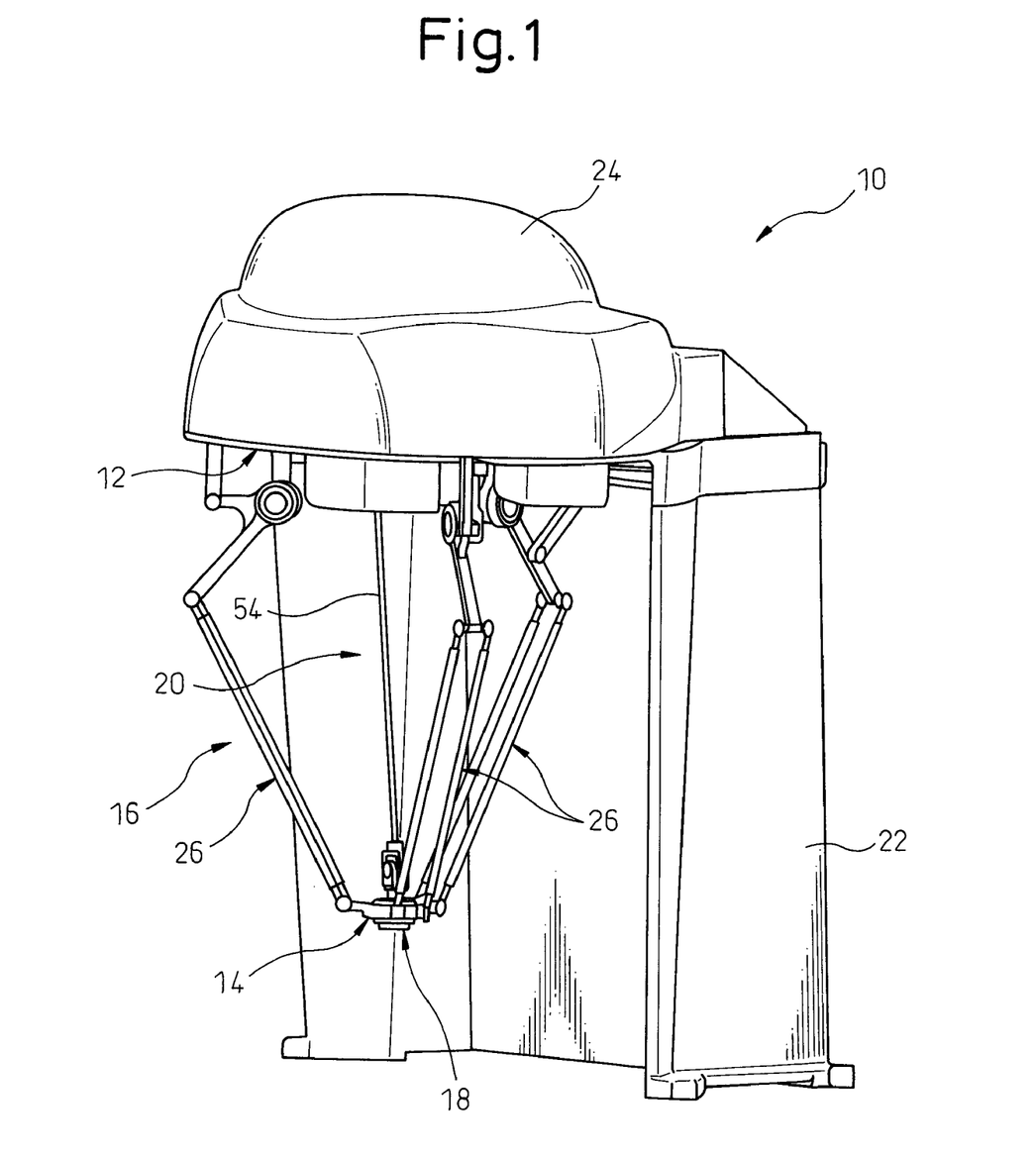
FIG. 1 is a perspective view of a parallel robot according to an embodiment of the present invention.
Figure 2:
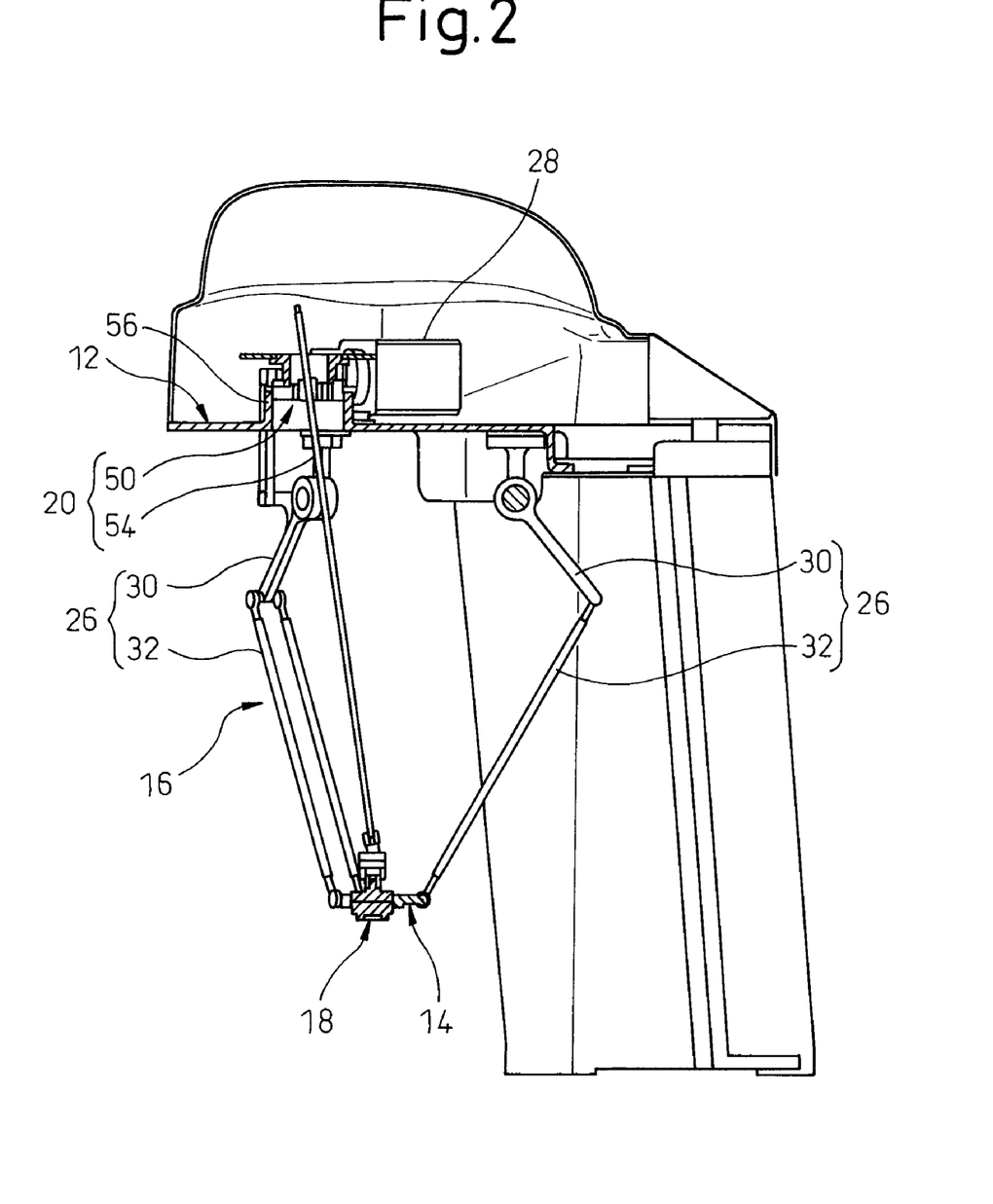
FIG. 2 is a vertical sectional view showing the parallel robot of FIG. 1.

Referring to the drawings, FIGS. 1 and 2 illustrate a parallel robot 10 according to an embodiment of the present invention. The parallel robot 10 is provided, as a manipulator, with a so-called parallel mechanism in which a base section and a movable section are interconnected by three assembled-link structures arranged in parallel, and has a configuration in which the movable section performs only a three-axis translational motion with respect to the base section as described below (in other words, the parallel robot 10 is provided with a parallel mechanism having three degrees of freedom). However, the present invention is not limited to such a configuration, but can also be applied to a configuration provided with a parallel mechanism having four or more degrees of freedom, in which the movable section can perform a one, two or three-axis rotational motion with respect to the base section in addition to the three-axis translational motion.

The parallel robot 10 includes a base section 12; a movable section 14 capable of moving with respect to the base section 12; a movable-section drive mechanism 16 having a parallel mechanism configuration and provided between the base section 12 and the movable section 14, the movable-section drive mechanism 16 operating to allow the movable section 14 to perform a three-axis translational motion with respect to the base section 12; a wrist section 18 provided rotatably in the movable section 14; and a wrist-section drive mechanism 20 operating to allow the wrist section 18 to perform a rotational motion with respect to the movable section 14.

The base section 12 is formed of a plate-like structure fixedly provided in a laterally and horizontally projecting manner at the top of an arcuate standing wall 22 placed on a mounting surface for the parallel robot 10. The base section 12 is configured as a stationary member for carrying several components of the movable-section drive mechanism 16 and the wrist-section drive mechanism 20 described below. A cover 24 is securely attached to the upper side of the base section 12 to cover drive motors, power transmission mechanisms, etc.

The movable-section drive mechanism 16 includes three assembled-link structures 26 arranged in parallel with each other, and three prime movers (or servo motors) 28 (only one motor is depicted in FIG. 2) for respectively driving the assembled-link structures 26. Each assembled-link structure 26 includes a driving link 30 articulately connected to the base section 12 and the output part of a corresponding prime mover 28 through a plurality of revolute pairs and an auxiliary link, and a parallel pair of driven links 32 articulately connected to the distal end of the driving link 30 through a revolute pair. The parallel driven links 32 are articulately connected at the distal ends thereof to the movable section 14 through a revolute pair. More specifically, universal joints (each including, e.g., a set of revolute pairs) are provided between the driving link 30 and the driven links 32, and also between the driven links 32 and the movable section 14.

The driving link 30 is driven by the prime mover 28 so as to variously swing along a virtual plane extending vertically to the base section 12. The driven links 32 are displaced along the same virtual plane, while accompanying the swing motion of the driving link 30. In this connection, the driven links 32 of one assembled-link structure 26 is connected to the driven links 32 of the other two assembled-link structures through the movable section 14, so that the respective parallel driven links 32 of the three assembled-link structures 26 variously swing, depending on the swinging mode of the three driving links 30.

The three assembled-link structures 26 have a configuration wherein the respective driving links 30 are connected to the base section 12 at three fixed positions spaced apart from each other by a central angle of every 120 degrees on the base section 12, and the respective driven links 32 are connected to the movable section 14 at three fixed positions spaced apart from each other by a central angle of every 120 degrees on the movable section 14. As a result, in response to the operation of the movable-section drive mechanism 16, the movable section 14 performs only the three-axis translational motion with respect to the base section 12.

Figure 3:
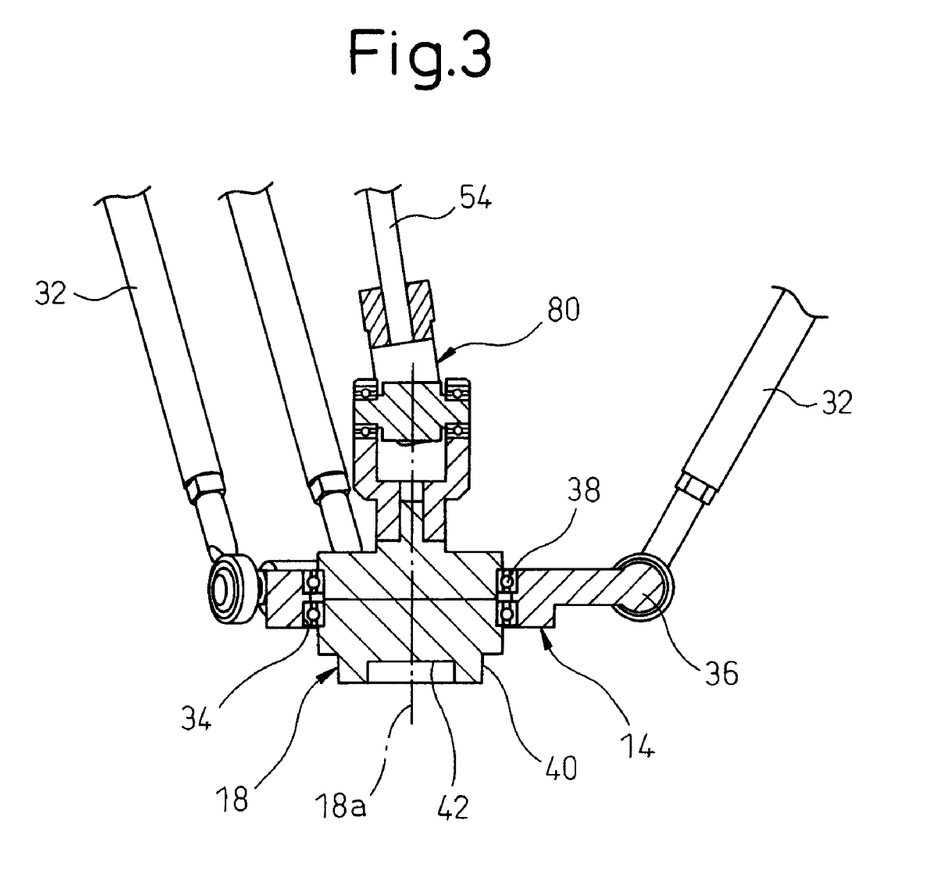
FIG. 3 is an enlarged sectional view showing a movable section and a wrist section of the parallel robot of FIG. 1.

As depicted in FIG. 3, the movable section 14 is formed of a disk-like member having a center through hole 34, and is provided at three positions on the outer circumference thereof with joint parts 36, to which the parallel driven links 32 are respectively connected. A rotational bearing unit 38 is provided in the through hole 34 of the movable section 14. The wrist section 18 is attached to the rotational bearing unit 38 and rotatably supported inside the through hole 34 (the center line of rotation of the wrist section 18 is referred to as a fourth rotation axis 18$a$). The wrist section 18 includes a rotary member 40 supported on the movable section 14 and rotatable about the fourth rotation axis 18$a$. The rotary member 40 is provided with a cylindrical outer circumferential surface, to which the inner ring of the rotational bearing unit 38 is fixed, and one axial end (a bottom end, in the drawing) including an attachment surface 42, to which a tool (or an end effector)

such as a hand (not depicted) is attached. A driven component of a universal joint, used for connecting a transmission member (described below) of the wrist-section drive mechanism 20 to the wrist section 18, is fixedly attached to the other axial end (a top end, in the drawing).

The wrist-section drive mechanism 20 is configured as an auxiliary drive mechanism for controlling the orientation of the tool (not depicted) attached to the wrist section 18 (or the rotary member 40) and mounted on the movable section 14. As depicted in FIGS. 2 to 5, the wrist-section drive mechanism 20 includes a holder assembly 50 configured by assembling three hollow cylindrical holders 44, 46 and 48 in a manner rotatable with respect to each other to form a triply nested structure, a prime mover (or a servo motor) 52 (FIG. 5) driving an outer holder 44 of the holder assembly 50 for rotation, and a rod-shaped transmission member 54 linearly movably received in an inner holder 48 of the holder assembly 50.

Figure 5:
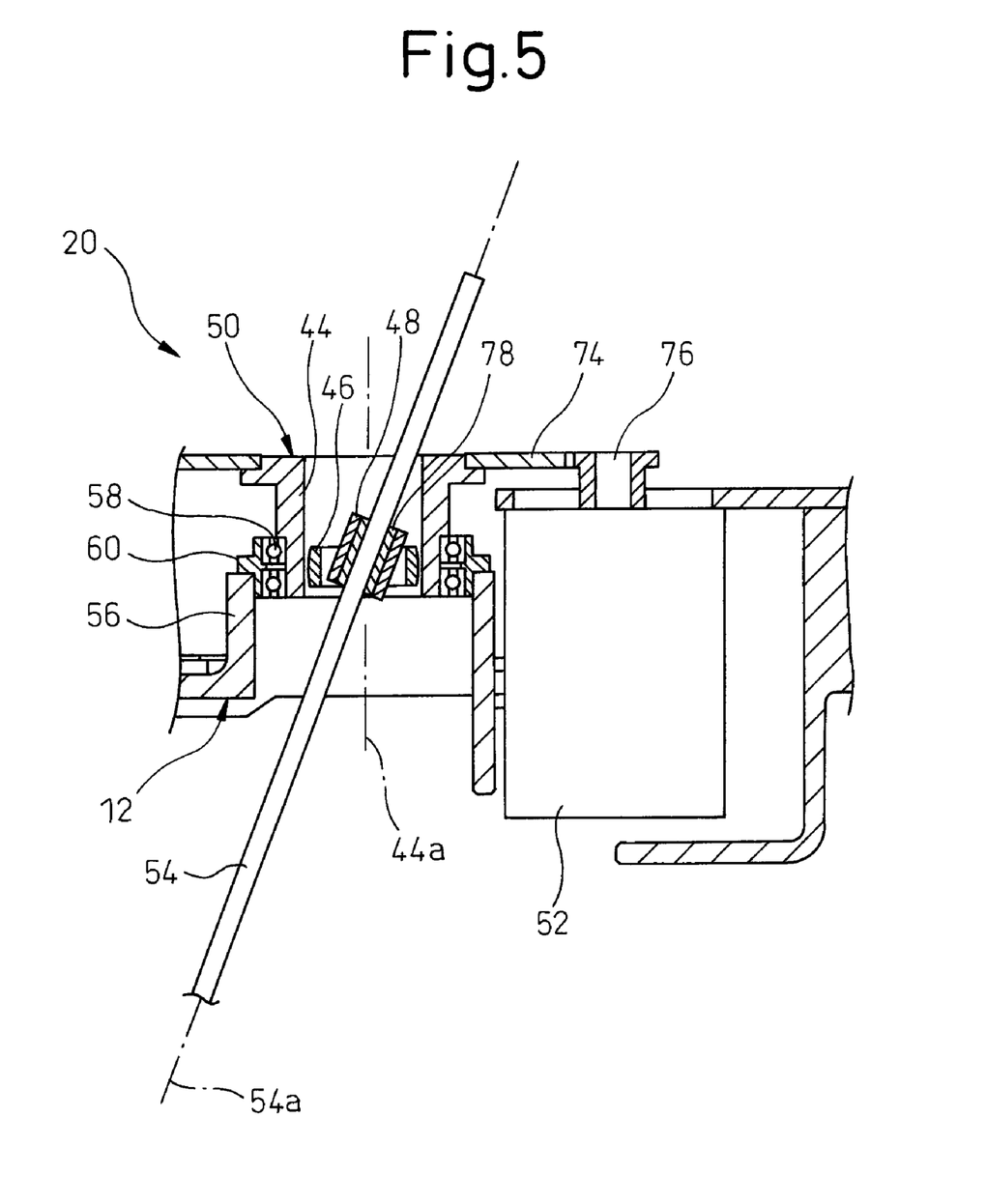
FIG. 5 is an enlarged sectional view showing a main portion of the wrist-section drive mechanism of the parallel robot of FIG. 1.

The base section 12 is provided, at a generally center position with respect to the three assembled-link structures 26, with a hollow cylindrical seat portion 56 formed to project toward the cover 24. The outer holder 44 of the holder assembly 50 is attached to the seat portion 56 through a rotational bearing unit 58. In the illustrated embodiment, the inner ring of the rotational bearing unit 58 is fixed to one axial-end region (a bottom-end region, in the drawing) of the outer circumferential surface of the outer holder 44, the outer ring of the rotational bearing unit 58 is fixed to the inner circumferential surface of a hollow cylindrical attachment member 60, and the attachment member 60 is fixed to one axial end (a top end, in the drawing) of the seat portion 56 (FIG. 5). In this state, the outer holder 44 is connected to the base section 12 and rotatable about a first rotation axis 44a extending vertically with respect to the base section 12 (i.e., with respect to the mounting surface for the parallel robot 10) with the internal space of the outer holder 44 being coaxially and juncturally arranged with respect to the internal space of the seat portion 56. In the illustrated embodiment, the first rotation axis 44 coincides with the geometrical center line of the cylindrical outer holder 44. The outer ring of the rotational bearing unit 58 may be directly fixed to the seat portion 56 without using the attachment member 60.

Figure 4A:
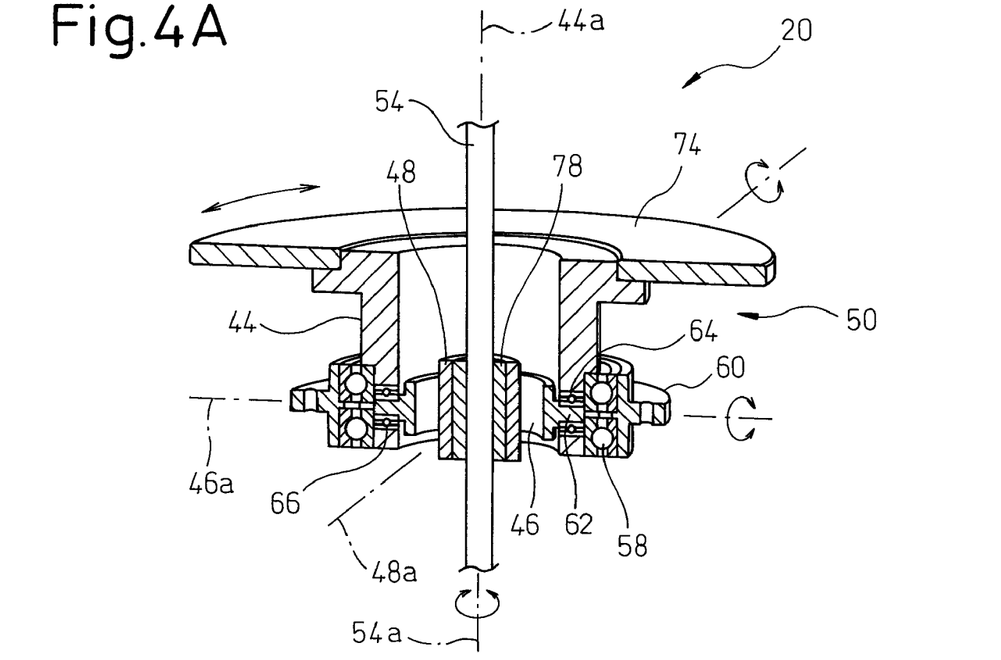

As depicted in FIG. 4A, the intermediate holder 46 of the holder assembly 50 is provided with an outer circumferential surface having a diameter smaller than the diameter of the inner circumferential surface of the outer holder 44 and a pair of spindles 62 projecting radially outward and formed at predetermined mutually-opposite positions spaced from each other by a central angle of 180 degrees on the outer circumferential surface of the intermediate holder 46. The spindles 62 are disposed so that geometrical center lines thereof coincide with each other and extend orthogonally to the geometrical center line of the intermediate holder 46. On the other hand, the outer holder 44 is provided with a pair of spindle holes 64 penetrating radially therethrough and formed at predetermined mutually-opposite positions spaced from each other by a central angle of 180 degrees on the inner circumferential surface of the outer holder 44. The spindle holes 64 are disposed so that the geometrical center lines thereof coincide with each other and extend orthogonally to the geometrical center line of the outer holder 44.

The intermediate holder 46 is attached to the outer holder 44 through a pair of rotational bearing units 66 respectively provided in the spindle holes 64, with the spindles 62 of the intermediate holder 46 being respectively inserted into the corresponding spindle holes 64 of the outer holder 44. More specifically, the inner ring of each rotational bearing unit 66 is fixed to the outer circumferential surface of each spindle 62 of the intermediate holder 46, and the outer ring of each rotational bearing unit 66 is fixed to the inner circumferential surface of each spindle hole 64 of the outer holder 44. In this state, the intermediate holder 46 is provided inside the outer holder 44 and rotatable about a second rotation axis 46a orthogonal to both the geometrical center line of the intermediate holder 46 and the first rotation axis 44a.

Figure 4B:
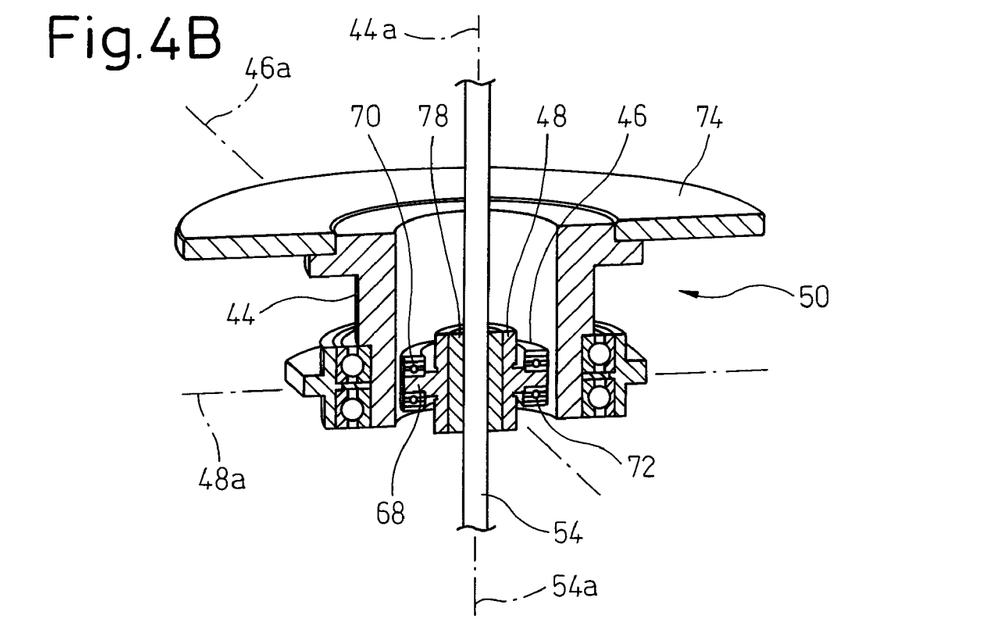

As depicted in FIG. 4B, the inner holder 48 of the holder assembly 50 is provided with an outer circumferential surface having a diameter smaller than the diameter of the inner circumferential surface of the intermediate holder 46 and a pair of spindles 68 projecting radially outward and formed at predetermined mutually-opposite positions spaced from each other by a central angle of 180 degrees on the outer circumferential surface of the inner holder 48. The spindles 68 are disposed so that geometrical center lines thereof coincide with each other and extend orthogonally to the geometrical center line of the inner holder 48. On the other hand, the intermediate holder 46 is provided with a pair of spindle holes 70 penetrating radially therethrough and formed at predetermined mutually-opposite positions spaced from each other by a central angle of 180 degrees and also spaced from the pair of spindles 62 by a central angle of 90 degrees. The spindle holes 70 are disposed so that the geometrical center lines thereof coincide with each other and extend orthogonally to the geometrical center line of the intermediate holder 46.

The inner holder 48 is attached to the intermediate holder 46 through a pair of rotational bearing units 72 respectively provided in the spindle holes 70, with the spindles 68 of the inner holder 48 being respectively inserted into the corresponding spindle holes 70 of the intermediate holder 46. More specifically, the inner ring of each rotational bearing unit 72 is fixed to the outer circumferential surface of each spindle 68 of the inner holder 48, and the outer ring of each rotational bearing unit 72 is fixed to the inner circumferential surface of each spindle hole 70 of the intermediate holder 46. In this state, the inner holder 48 is provided inside the intermediate holder 46 and rotatable about a third rotation axis 48a orthogonal to both the geometrical center line of the inner holder 48 and the second rotation axis 46a.

A gear 74 as a power transmission element is fixed to the other axial end (a top end, in the drawing) of the outer circumferential surface of the outer holder 44. An output shaft 76 of the prime mover (or servo motor) 52 is meshed with the gear 74 (FIG. 5). The prime mover 52 drives the outer holder 44 through the gear 74 so as to rotate about the first rotation axis 44a. Alternatively, in place of the gear 74, a belt and a pulley may be used as the power transmission element.

The transmission member 54 is a monolithic or single-piece rod-shaped element provided with an outer circumferential surface having a diameter smaller than the diameter of the inner circumferential surface of the inner holder 48 of the holder assembly 50, and is attached to the inner holder 48 through a linear bearing member 78 provided inside the inner holder 48. In this state, the transmission member 54 is received in the inner holder 48 and linearly movable over the entire length of the transmission member 54 in a rotationally restrained state, along a linear-motion axis 54a parallel to the geometrical center lines of both the transmission member 54 and the inner holder 48 and orthogonal to the third rotation axis 48a. In the illustrated embodiment, the linear-motion axis 54a coincides with the geometrical center lines of both the transmission member 54 and the inner holder 48.

In order to improve accuracy in a tool orientation control, it is necessary that the linear bearing member 78 guiding the transmission member 54 in a rotationally restrained state can transmit the output power of the prime mover 52 to the transmission member 54 while eliminating loss of power as much as possible. From this viewpoint, a spline nut of a ball spline unit can be preferably used as the linear bearing member 78. In this case, the transmission member 54 has a configuration of a spline shaft of the ball spline unit. The ball spline unit is known in the art and thus is not described herein in detail.

The holder assembly 50 acts as a universal joint arranged between the transmission member 54 and the base section 12 or the output shaft 76 of the prime mover 52 and having a special configuration capable of performing a relative motion along the geometrical center line (or linear-motion axis 54*a*) of the transmission member 54. More specifically, the outer holder 44 is a driving-side component of the special universal joint and the inner holder 48 is a driven-side component of the special universal joint. Therefore, in either a positional relationship wherein the linear-motion axis 54*a* is parallel to the first rotation axis 44*a* of the outer holder 44 or a positional relationship wherein the linear-motion axis 54*a* is oblique to the first rotation axis 44*a*, the transmission member 54 can rotate together or integrally with the inner holder 48 about the linear-motion axis 54*a* in synchronization with the rotation of the outer holder 44 driven by the prime mover 52.

In the holder assembly 50, the allowable inclination angle of the transmission member 54 with respect to the outer holder 44 (i.e., of the linear-motion axis 54*a* with respect to the first rotation axis 44*a*) is determined by the relative positional and dimensional relationship among the outer holder 44, the intermediate holder 46 and the inner holder 48. In the typical work of the parallel robot 10 (e.g., a handling work), it is desirable that the transmission member 54 can be inclined in the range of about 0 to 40 degrees. As depicted in the drawings, the holder assembly 50 configured by assembling three hollow cylindrical holders 44, 46, 48 to form a triply nested structure can be constructed in such a manner that the intermediate holder 46 and the inner holder 48 do not substantially protrude outward from the outer holder 44. Therefore, it is possible to easily reduce the overall dimensions of the holder assembly 50 without impairing the required ability of the universal joint.

The transmission member 54 is swingably connected, at one end (a bottom end, in the drawing) spaced from the inner holder 48 of the holder assembly 50, to the wrist section 18 (or the rotary member 40) through a universal joint 80 having a typical structure (FIG. 3). In this configuration, the transmission member 54 operates to smoothly transmit the rotation of the outer holder 44 about the first rotation axis 44*a* of the holder assembly 50 to the wrist section 18 (or the rotary member 40), and to allow the wrist section 18 (or the rotary member 40) to perform a rotational motion about the fourth rotation axis 18*a* orthogonal to the third rotation axis 48*a* of the holder assembly 50. In this connection, the wrist section 18 (or the rotary member 40) is mounted on the movable section 14 by the rotational bearing unit 38, and therefore, it is possible to implement a single-axis orientation control of a tool (not depicted) by a simple configuration.

In particular, in the parallel robot 10, the transmission member 54 can smoothly follow the three-axis translational motion of the movable section 14 and wrist section 18 obtained by the movable-section drive mechanism 16 having the parallel mechanism configuration, and thus can passively move along the linear-motion axis 54*a* with respect to the holder assembly 50 as a universal joint arranged between the transmission member 54 and the base section 12 or the prime-mover output shaft 76. As a result, when the movable section 14 and the wrist section 18 are located at a desired (or commanded) spatial position within the operational space thereof, the torque of the prime mover 52 can be reliably transmitted to the tool (not depicted) on the wrist section 18. In this connection, as described above, the movable-section drive mechanism 16 drives the movable section 14 so that the movable section 14 performs only a three-axis translational motion with respect to the base section 12. Therefore, during the operation of the movable-section drive mechanism 16, the fourth rotation axis 18*a* of the wrist section 18 is always disposed parallel to the first rotation axis 44*a* of the holder assembly 50. As a result, the angular velocity of the outer holder 44 corresponds to the angular velocity of the wrist section 18 (or the rotary member 40), regardless of the inclination angle of the transmission member 54 with respect to the base section 12, and therefore, it is possible to easily implement the highly accurate control of the tool orientation.

In the configuration described above, when the transmission member 54 follows the three-axis translational motion of the movable section 14 and the wrist section 18, the transmission member 54 tends to protrude upward from the outer holder 44 of the holder assembly 50 carried on the base section 12 in various angles and by various lengths. Therefore, in order to avoid a mutual interference between the prime mover 52 and the transmission member 54, it is advantageous that the prime mover 52 of the wrist-section drive mechanism 20 is carried on the base section 12 at a position adjacent to the outer holder 44 so as not to protrude beyond the outer holder 44 in a direction (an upward direction, in the drawing) away from the movable section 14 (FIG. 5).

As described above, in the parallel robot 10 according to the embodiment of the present invention, the wrist-section drive mechanism 20 as an auxiliary drive mechanism for controlling the tool orientation has a configuration wherein the prime mover 52 and the transmission member 54 are interconnected by the holder assembly 50 acting as a universal joint and configured by assembling three holders 44, 46, 48 rotatable about the mutually orthogonal axes 44*a*, 46*a*, 48*a* to form a triply nested structure, and the transmission member 54 passively performs a linear motion in a rotationally restrained state with respect to the inner holder 48 as a driven-side component in the holder assembly 50, so that, when the movable section 14 and the wrist section 18 are located at a desired spatial position within the operational space thereof, it is possible to transmit the torque of the prime mover 52 to the wrist section 18 and thus to control a tool orientation. In this connection, in a conventional parallel robot, a transmission member used in an auxiliary drive mechanism for a tool orientation control is configured from a pair of rod-shaped elements having a telescopic configuration or a linearly-shiftable parallel configuration, and thus the elongation/contraction stroke of the transmission member may be restricted by a mutual interference between the components of a pair of universal joints provided for the respective rod-shaped members and a linear bearing component as a member separated from the universal joints. In contrast, in the parallel robot 10, the inner holder 48 as a linear bearing component for the transmission member 54 is structurally integrated with the holder assembly 50 as one of universal joints provided for the transmission member 54, and thereby it is possible to ensure the linear motion stroke of the transmission member 54 in a range defined by the substantially entire length of the transmission member 54, i.e., until a pair of universal joints (i.e., the holder assembly 50 and the universal joint 80) interfere with each other. As a result, in the parallel robot 10, it is possible to reliably transmit the torque of the prime mover 52 to the wrist section 18 and thus to control a tool orientation, even when the movable section 14 and the wrist section 18 are located at any spatial position within an operational space inherently provided for the movable section 14 and the wrist section 18 and determined by the movable-section drive mechanism 16 having the parallel mechanism configuration, without restricting such an inherent operational space by the configuration of the wrist-section drive mechanism 20.

Further, the conventional parallel robot has problems resulting from the inertial force of the transmission member configured by assembling a pair of rod-shaped elements. By contrast, in the parallel robot 10, the transmission member 54 is configured to linearly move in its entirety with respect to the holder assembly 50 acting as a universal joint, so that the transmission member 54 can be made of a monolithic or single-piece rod-shaped element. As a result, in the parallel robot 10, it is possible to ensure sufficient stiffness of the transmission member 54 and to improve operational accuracy of the wrist-section drive mechanism 20, while eliminating a concern such that the inertial force of the transmission member 54 affects the motion of the movable section 14. Moreover, the holder assembly 50 configured by assembling three holders 44, 46, 48 to form a triply nested structure can easily increase the stiffness of a torque transmitting portion in comparison with a universal joint having a typical structure (e.g., the universal joint 80), so that it is possible to more effectively improve the stiffness and operational accuracy of the wrist-section drive mechanism 20.

Figure 6:
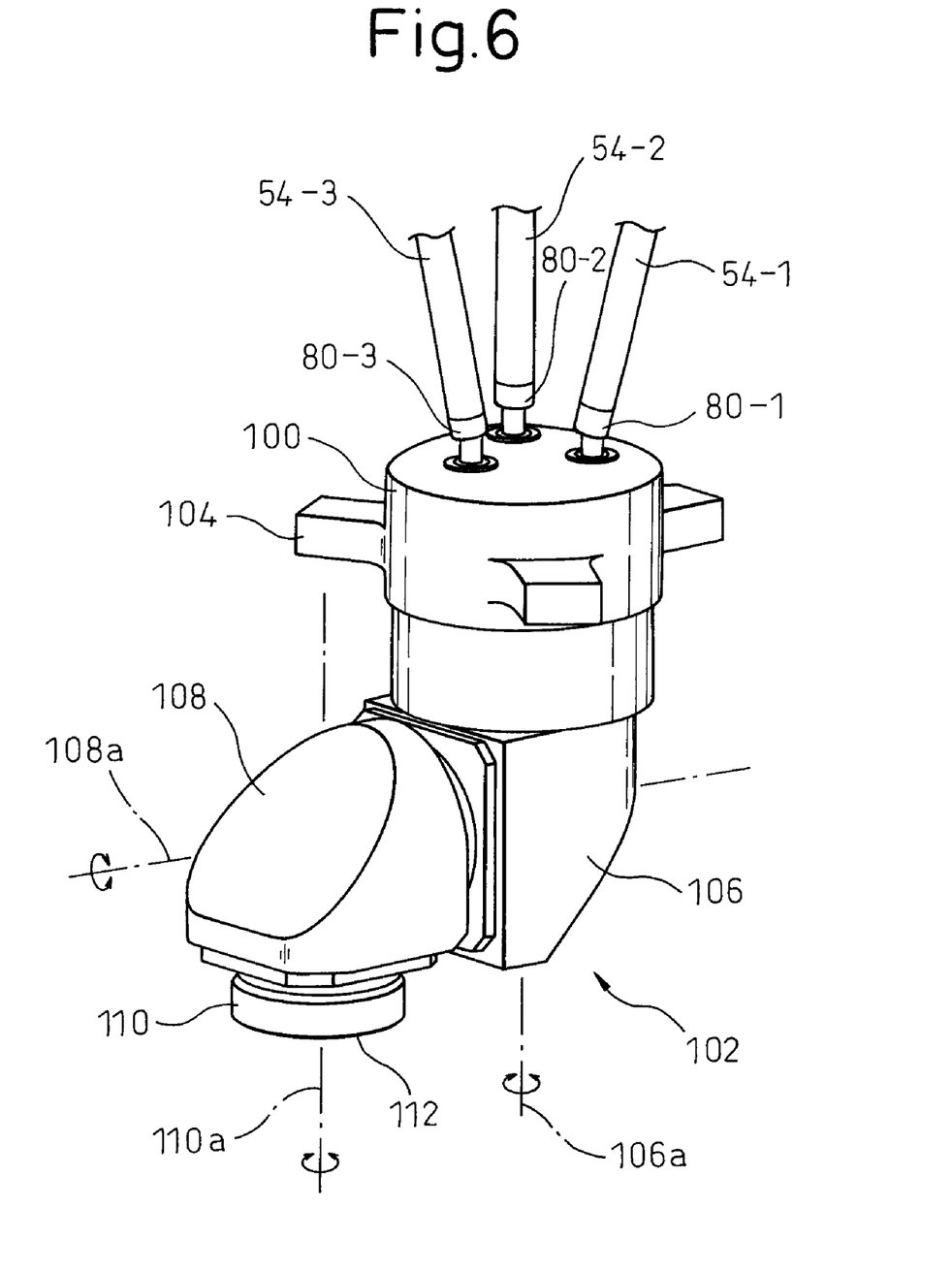
FIG. 6 is an enlarged sectional view showing a movable section and a wrist section of a parallel robot according to another embodiment of the present invention.

FIG. 6 depicts a movable section 100 and a wrist section 102, in a parallel robot according to another embodiment of the present invention. The parallel robot according to this embodiment has components substantially identical to those of the parallel robot 10 described above, except for the configuration of the movable section 100 and the wrist section 102, and thus the substantially identical components are not depicted in the drawing but described below using the same reference numerals.

The parallel robot according to the illustrated embodiment is provided with three wrist-section drive mechanisms 20 (each including a holder assembly 50, a prime mover 52 and a transmission member 54) capable of operating independently of each other. A base section 12 is provided thereon with three seat portions 56, each of which is similar to the seat portion 56 depicted in FIG. 2, and which are formed at appropriate positions around a generally center position with respect to three assembled-link structures 26, and the outer holders 44 of the holder assemblies 50 are attached to the respective seat portions 56. As a result, the three wrist-section drive mechanisms 20 are configured in such a manner that the first rotation axes 44a of the respective holder assemblies 50 are arranged parallel to each other.

The movable section 100 is formed of a cylindrical member having a cavity part (not depicted), and is provided at three positions on the outer circumference thereof with joint parts 104, to which the parallel driven links 32 of the three assembled-link structures 26 of a movable-section drive mechanism 16 are respectively connected. Rotational bearing units and power transmission mechanisms (not depicted) are accommodated in the cavity part of the movable section 100. The wrist section 102 is supported rotatably on the bottom side (in the drawing) of the movable section 100.

The wrist section 102 includes a first rotary member 106 supported on the movable section 100 and rotatable about a fourth rotation axis 106a, a second rotary member 108 connected to the first rotary member 106 and rotatable about a fifth rotation axis 108a orthogonal to the fourth rotation axis 106a, and a third rotary member 110 connected to the second rotary member 108 and rotatable about a sixth rotation axis 110a orthogonal to the fifth rotation axis 108a. The third rotary member 110 is provided with an attachment surface 112 to which a tool (not depicted) is attached.

A first one of the three wrist-section drive mechanisms 20 includes a first transmission member 54-1 connected to the first rotary member 106 through a first universal joint 80-1 and power transmission elements such as gear trains (not depicted). The first transmission member 54-1 operates to transmit a rotation of a first outer holder 44 driven for rotation by a first prime mover 52 to the first rotary member 106, and to allow the first rotary member 106 to perform a rotational motion about the fourth rotation axis 106a. The operational mode of the first wrist-section drive mechanism 20 is substantially identical to the aforementioned operational mode of the wrist drive mechanism 20 of the parallel robot 10.

A second one of the three wrist-section drive mechanisms 20 includes a second transmission member 54-2 connected to the second rotary member 108 through a second universal joint 80-2 and power transmission elements such as gear trains (not depicted). The second transmission member 54-2 operates to transmit a rotation of a second outer holder 44 driven for rotation by a second prime mover 52 to the second rotary member 108, and to allow the second rotary member 108 to perform a rotational motion about the fifth rotation axis 108a. The operational mode of the second wrist-section drive mechanism 20 is provided to perform, e.g., a turn by 90-degrees of a rotation axis caused by the power transmission elements built in the wrist section 102, in addition to the aforementioned operational mode of the wrist-section drive mechanism 20 of the parallel robot 10.

A third one of the three wrist-section drive mechanisms 20 includes a third transmission member 54-3 connected to the third rotary member 110 through a third universal joint 80-3 and power transmission elements such as gear trains (not depicted). The third transmission member 54-3 operates to transmit a rotation of a third outer holder 44 driven for rotation by a third prime mover 52 to the third rotary member 110, and to allow the third rotary member 110 to perform a rotational motion about the sixth rotation axis 110a. The operational mode of the third wrist-section drive mechanism 20 is provided to perform, e.g., a turn by 90 degrees of a rotation axis in forward and backward directions caused by the power transmission elements built in the wrist section 102, in addition to the aforementioned operational mode of the wrist-section drive mechanism 20 of the parallel robot 10.

The parallel robot having the above configuration can also exhibit several effects equivalent to the aforementioned effects of the parallel robot 10. Further, the above parallel robot includes the wrist section 102 having three degrees of freedom and three wrist-section drive mechanisms 20 for driving the wrist section 102, so that it is possible to allow a tool (not depicted) attached to the wrist section 102 to perform the three-axis translational motion and the three-axis rotational motion in an appropriate combination, by the operations of the wrist-section drive mechanisms 20 and the movable-section drive mechanism 16 having three degrees of freedom.

As will be understood from the above, a parallel robot according to one aspect of the present invention includes a base section; a movable section capable of moving with respect to the base section; a movable-section drive mechanism having a parallel mechanism configuration and provided between the base section and the movable section, the movable-section drive mechanism operating to allow the movable section to perform a three-axis translational motion with respect to the base section; a wrist section provided rotatably in the movable section; and a wrist-section drive mechanism operating to allow the wrist section to perform a rotational motion with respect to the movable section. The wrist-section drive mechanism includes a hollow outer holder connected to the base section and rotatable about a first rotation axis; a hollow intermediate holder provided inside the outer holder and rotatable about a second rotation axis orthogonal to the first rotation axis; a hollow inner holder provided inside the intermediate holder and rotatable about a third rotation axis orthogonal to the second rotation axis; a prime mover driving the outer holder to rotate about the first rotation axis; and a rod-shaped transmission member received in the inner holder and linearly movable in a rotationally restrained state along a linear-motion axis orthogonal to the third rotation axis, the rod-shaped transmission member being connected, at one end thereof spaced from the inner holder, to the wrist section through a universal joint. The transmission member operates to transmit a rotation of the outer holder about the first rotation axis to the wrist section, and to allow the wrist section to perform a rotational motion about a fourth rotation axis orthogonal to the third rotation axis.

In the above configuration, the wrist-section drive mechanism as an auxiliary drive mechanism for controlling a tool orientation is configured in such a manner that the prime mover and the transmission member are interconnected by a holder assembly acting as a universal joint and configured by assembling three holders rotatable about the mutually orthogonal first to third rotation axes to form a triply nested structure, and the transmission member performs a linear motion in a rotationally restrained state with respect to the inner holder as a driven-side component in the holder assembly, so that, when the movable section and the wrist section are located at a desired spatial position within the operational space thereof, it is possible to transmit the torque of the prime mover to the wrist section and thus to rotate the wrist section. Therefore, the inner holder as a linear bearing component for the transmission member is structurally integrated with the holder assembly as one of universal joints provided for the transmission member, and thereby it is possible to ensure the linear motion stroke of the transmission member in a range defined by the substantially entire length of the transmission member, i.e., until a pair of universal joints (i.e., the holder assembly and a universal joint at another end) interfere with each other. As a result, it is possible to reliably transmit the torque of the prime mover to the wrist section and thus to control a tool orientation, even when the movable section and the wrist section are located at any spatial position within an operational space inherently provided for the movable section and the wrist section and determined by the movable-section drive mechanism having the parallel mechanism configuration, without restricting such an inherent operational space by the configuration of the wrist-section drive mechanism. Further, the transmission member is configured to linearly move in its entirety with respect to the holder assembly acting as a universal joint, so that the transmission member can be made of a monolithic or single-piece rod-shaped element. As a result, it is possible to ensure sufficient stiffness of the transmission member and to improve operational accuracy of the wrist-section drive mechanism, while eliminating a concern such that the inertial force of the transmission member affects the motion of the movable section.

The above-described parallel robot may be configured in such a manner that the wrist section includes a rotary member supported on the movable section and rotatable about the fourth rotation axis, the rotary member being provided with an attachment surface to which a tool is attached. In this configuration, it is possible to implement a single-axis orientation control of a tool (not depicted) by a simple configuration.

The above-described parallel robot may be configured in such a manner that three wrist-section drive mechanisms capable of operating independently of each other are provided, respective first rotation axes of the three wrist-section drive mechanisms being arranged parallel to each other; wherein the wrist section includes a first rotary member supported on the movable section and rotatable about the fourth rotation axis, a second rotary member connected to the first rotary member and rotatable about a fifth rotation axis orthogonal to the fourth rotation axis, and a third rotary member connected to the second rotary member and rotatable about a sixth rotation axis orthogonal to the fifth rotation axis, the third rotary member being provided with an attachment surface to which a tool is attached; wherein a first one of the wrist-section drive mechanisms comprises a first transmission member, as the rod-shaped transmission member, connected to the first rotary member through a first universal joint, the first transmission member operating to transmit a rotation of a first outer holder driven for rotation by a first prime mover to the first rotary member, and to allow the first rotary member to perform a rotational motion about the fourth rotation axis; wherein a second one of the wrist-section drive mechanisms comprises a second transmission member, as the rod-shaped transmission member, connected to the second rotary member through a second universal joint, the second transmission member operating to transmit a rotation of a second outer holder driven for rotation by a second prime mover to the second rotary member, and to allow the second rotary member to perform a rotational motion about the fifth rotation axis; and wherein a third one of the wrist-section drive mechanisms comprises a third transmission member, as the rod-shaped transmission member, connected to the third rotary member through a third universal joint, the third transmission member operating to transmit a rotation of a third outer holder driven for rotation by a third prime mover to the third rotary member, and to allow the third rotary member to perform a rotational motion about the sixth rotation axis. In this configuration, it is possible to allow a tool (not depicted) attached to the wrist section to perform the three-axis translational motion and the three-axis rotational motion in an appropriate combination, by the operations of three wrist-section drive mechanisms for driving the wrist section having three degrees of freedom and the movable-section drive mechanism having three degrees of freedom.

The above-described parallel robot may be configured in such a manner that the movable-section drive mechanism comprises three assembled-link structures constituting a parallel mechanism and respectively connected to the base section at fixed positions apart from each other by a central angle of 120 degrees; and wherein the fourth rotation axis is always disposed parallel to the first rotation axis during an operation of the movable-section drive mechanism. In this configuration, the angular velocity of the outer holder corresponds to the angular velocity of the wrist section, regardless of the inclination angle of the transmission member with respect to the base section, and therefore, it is possible to easily implement the highly accurate control of the tool orientation.

The above-described parallel robot may be configured in such a manner that a ball spline unit is provided between the inner holder and the transmission member. In this configuration, it is possible to transmit the output power of the prime mover to the transmission member while eliminating loss of power as much as possible, and thus improve accuracy in a tool orientation control.

The above-described parallel robot may be configured in such a manner that the outer holder is carried on the base section; and wherein the prime mover is carried on the base section adjacently to the outer holder so as not to protrude beyond the outer holder in a direction away from the movable section. In this configuration, it is possible to avoid interference between the prime mover and the transmission member when the transmission member follows the three-axis translational motion of the movable section and the wrist section.

While the invention has been described with reference to specific preferred embodiments, it will be understood, by those skilled in the art, that various changes or modifications may be made thereto without departing from the scope of the following claims.

The invention claimed is:

1. A parallel robot comprising:
a base section;
a movable section capable of moving with respect to said base section;
a movable-section drive mechanism having a parallel mechanism configuration and provided between said base section and said movable section, said movable-section drive mechanism operating to allow said movable section to perform a three-axis translational motion with respect to said base section;
a wrist section provided rotatably in said movable section; and
a wrist-section drive mechanism operating to allow said wrist section to perform a rotational motion with respect to said movable section;
wherein said wrist-section drive mechanism comprises:
a hollow outer holder connected to said base section and rotatable about a first rotation axis;
a hollow intermediate holder provided inside said outer holder and rotatable about a second rotation axis orthogonal to said first rotation axis;
a hollow inner holder provided inside said intermediate holder and rotatable about a third rotation axis orthogonal to said second rotation axis;
a prime mover driving said outer holder to rotate about said first rotation axis through a power transmission element, said prime mover arranged outside a holder assembly configured by assembling said outer holder, said intermediate holder and said inner holder; and
a rod-shaped transmission member received in said inner holder and linearly movable in a rotationally restrained state along a linear-motion axis orthogonal to said third rotation axis, said rod-shaped transmission member being connected, at one end thereof spaced from said inner holder, to said wrist section through a universal joint;
wherein said transmission member operates to transmit a rotation of said outer holder about said first rotation axis to said wrist section through said universal joint, and to allow said wrist section to perform a rotational motion about a fourth rotation axis orthogonal to said third rotation axis and different from said linear-motion axis; and
wherein said outer holder is carried on said base section, and said prime mover is carried on said base section adjacently to said outer holder so as not to protrude beyond said outer holder in a direction away from said movable section.

2. The parallel robot of claim 1, wherein said wrist section includes a rotary member supported on said movable section and rotatable about said fourth rotation axis, said rotary member being provided with an attachment surface to which a tool is attached.

3. The parallel robot of claim 1, wherein three wrist-section drive mechanisms capable of operating independently of each other are provided, respective first rotation axes of said three wrist-section drive mechanisms being arranged parallel to each other;
wherein said wrist section includes a first rotary member supported on said movable section and rotatable about said fourth rotation axis, a second rotary member connected to said first rotary member and rotatable about a fifth rotation axis orthogonal to said fourth rotation axis, and a third rotary member connected to said second rotary member and rotatable about a sixth rotation axis orthogonal to said fifth rotation axis, said third rotary member being provided with an attachment surface to which a tool is attached;
wherein a first one of said wrist-section drive mechanisms comprises a first transmission member, as said rod-shaped transmission member, connected to said first rotary member through a first universal joint, said first transmission member operating to transmit a rotation of a first outer holder driven for rotation by a first prime mover to said first rotary member, and to allow said first rotary member to perform a rotational motion about said fourth rotation axis;
wherein a second one of said wrist-section drive mechanisms comprises a second transmission member, as said rod-shaped transmission member, connected to said second rotary member through a second universal joint, said second transmission member operating to transmit a rotation of a second outer holder driven for rotation by a second prime mover to said second rotary member, and to allow said second rotary member to perform a rotational motion about said fifth rotation axis; and
wherein a third one of said wrist-section drive mechanisms comprises a third transmission member, as said rod-shaped transmission member, connected to said third rotary member through a third universal joint, said third transmission member operating to transmit a rotation of a third outer holder driven for rotation by a third prime mover to said third rotary member, and to allow said third rotary member to perform a rotational motion about said sixth rotation axis.

4. The parallel robot of claim 1, wherein said movable-section drive mechanism comprises three assembled-link structures constituting a parallel mechanism and respectively connected to said base section at fixed positions apart from each other by a central angle of 120 degrees; and wherein said fourth rotation axis is always disposed parallel to said first rotation axis during an operation of said movable-section drive mechanism.

5. The parallel robot of claim 1, wherein a ball spline unit is provided between said inner holder and said transmission member.

* * * * *